United States Patent [19]

Koshiishi

[11] Patent Number: 5,446,905
[45] Date of Patent: Aug. 29, 1995

[54] DATA PROCESSING APPARATUS HAVING IMPROVED POWER SUPPLY SYSTEM

[75] Inventor: Takaho Koshiishi, Tokyo, Japan

[73] Assignee: Ricoh Company, Ltd., Tokyo, Japan

[21] Appl. No.: 3,855

[22] Filed: Jan. 11, 1993

Related U.S. Application Data

[63] Continuation of Ser. No. 598,151, Oct. 16, 1990, abandoned.

[30] Foreign Application Priority Data

Oct. 18, 1989 [JP] Japan ................... 1-269135

[51] Int. Cl.6 .............................................. G06F 1/26
[52] U.S. Cl. .................................. 395/750; 358/412
[58] Field of Search ................. 395/750; 307/66, 10.1, 307/64, 65, 85–87; 358/296, 412; 364/707

[56] References Cited

U.S. PATENT DOCUMENTS

| | | | |
|---|---|---|---|
| 4,366,489 | 12/1982 | Yamaguchi | 346/76 PH |
| 4,480,278 | 10/1984 | Maeda | 358/190 X |
| 4,595,872 | 6/1986 | Ball | 307/66 X |
| 4,796,091 | 1/1989 | Nohtomi | 358/296 X |
| 4,834,562 | 5/1989 | Shikanai et al. | 400/121 X |
| 4,999,775 | 3/1991 | Muraoka | 307/10.1 X |
| 5,016,124 | 5/1991 | Fukushima et al. | 358/906 X |
| 5,019,717 | 5/1991 | McCurry | 307/66 |

Primary Examiner—Jack B. Harvey
Assistant Examiner—Glenn A. Auve
Attorney, Agent, or Firm—Oblon, Spivak, McClelland, Maier & Neustadt

[57] ABSTRACT

A data processing apparatus includes a data processing part, a power supply connector, and an original power supply device connected to the power supply connector and selected from among a commercial power source adapter outputting a direct-current voltage generated from a commercial power source, a battery unit, and a connection device coupled to an automobile power source. The apparatus includes a DC/DC converter which generates DC power supply voltages from an original power supply voltage supplied from the original power supply device via the power supply connector, and a power supply switching unit which supplies the original power supply voltage and the direct-current power supply voltages to the data processing part when one of the commercial power source adapter or the battery unit is connected to the power supply connector and which supplies only the direct-current power supply voltages generated by the DC/DC converter to the data processing part when the connection device coupled to the automobile power source is connected to the power supply connector.

13 Claims, 7 Drawing Sheets

FIG. IA  PRIOR ART
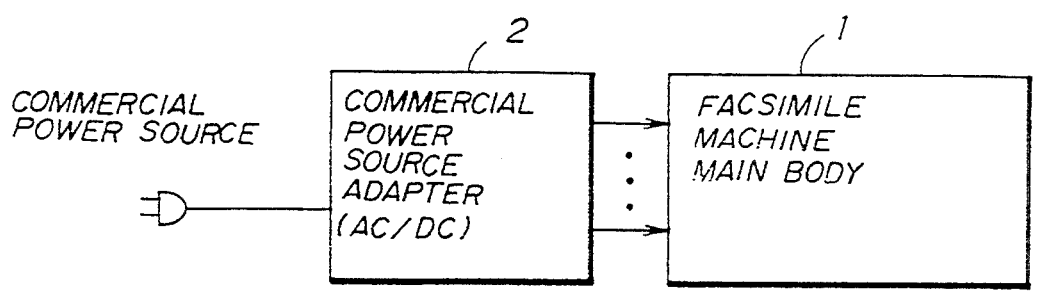
FIG. IB  PRIOR ART
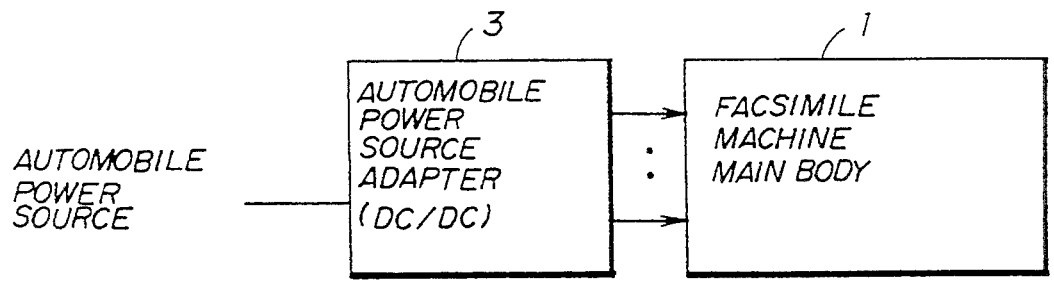
FIG. IC  PRIOR ART
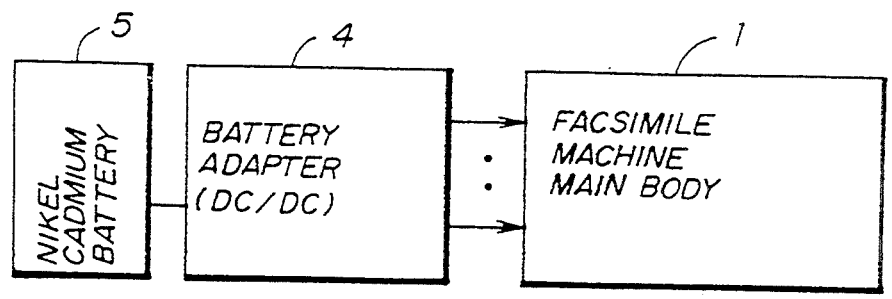

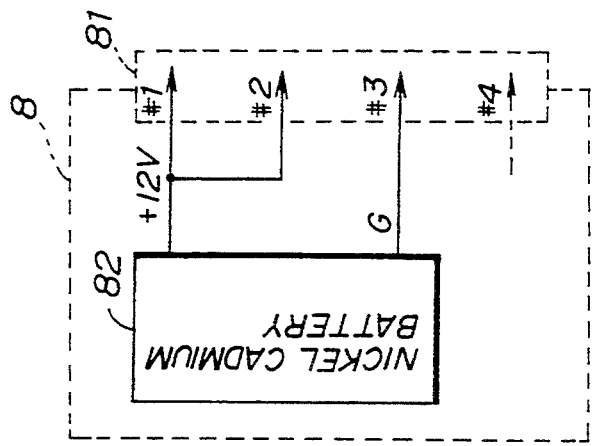
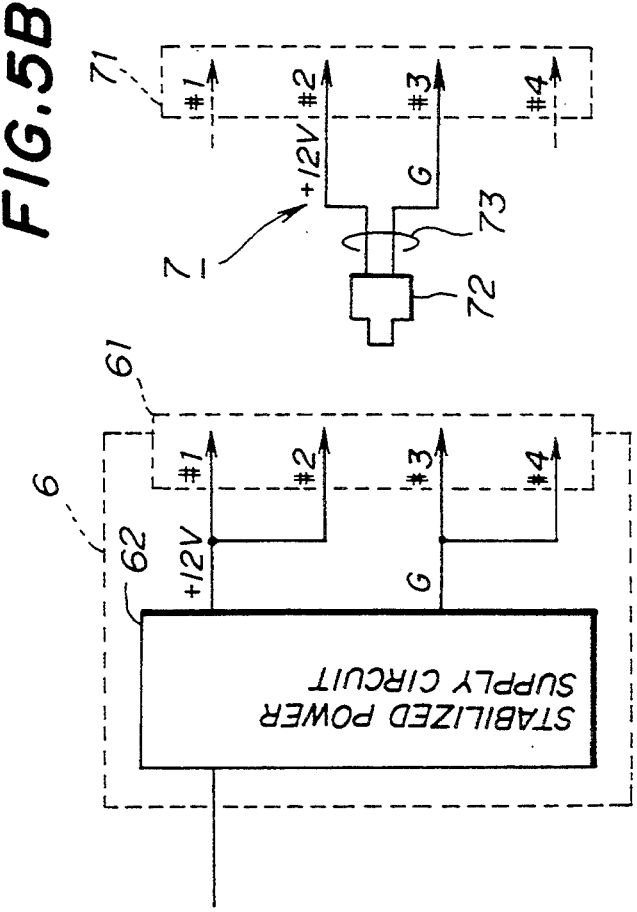

DATA PROCESSING APPARATUS HAVING IMPROVED POWER SUPPLY SYSTEM

This application is a continuation of application Ser. No. 07/598,151, filed on Oct. 16, 1990, now abandoned.

BACKGROUND OF THE INVENTION

The present invention generally relates to a compact and portable data processing apparatus such as a compact and portable facsimile machine, and more particularly to an improvement in a power supply system of such a compact and portable data processing apparatus.

Recently, there has been considerable activity in the development of a compact and portable facsimile machine. A compact and portable facsimile machine is designed to be used not only indoors, but also outdoors and in an automobile. Such a compact and portable facsimile machine must be suitable for various power sources.

As shown in FIG. 1A, a facsimile machine main body 1 of a facsimile machine is connected to a commercial power source adapter 2 when the facsimile machine is used indoors. The commercial power source adapter 2 is formed of an AC/DC (alternating current/direct current) converter, which generates DC power having various voltages equal to, for example, ±5 volts or ±12 volts from a commercial AC voltage. When the facsimile machine is used in an automobile, as shown in FIG. 1B, an automobile power source adapter 3 formed of a DC/DC converter is connected to the facsimile machine main body 1. The automobile power source adapter 3 has the function of converting automobile DC power into DC power having various voltages. When the facsimile machine is used outdoors, the facsimile machine main body 1 is coupled to a battery, such as a nickel cadmium battery, through a battery adapter 4. The battery adapter 4 is also formed of a DC/DC converter, which generates the necessary DC power having various voltages from the battery power source.

As described above, the conventional facsimile machine needs different adapters for different applications. This increases the production cost of facsimile machines. Further, the entire power supply system of the facsimile machine is not configured efficiently. For example, the automobile power source adapter 3 and the battery adapter 4 have the respective DC/DC converters.

SUMMARY OF THE INVENTION

It is a general object of the present invention to provide a data processing apparatus having an improved power supply system.

A more specific object of the present invention is to provide a less expensive data processing apparatus having an improved power supply system.

The above-mentioned objects of the present invention are achieved by a data processing apparatus comprising: data processing means for processing data; a power supply connector; and an original power supply device connected to the power supply connector and selected from among a commercial power source adapter outputting a direct-current voltage generated from a commercial power source, a battery unit, and a connection device coupled to an automobile power source. The data processing apparatus also comprises: direct-current/direct-current (DC/DC) converter means, coupled to the power supply connector, for generating direct-current power supply voltages from an original power supply voltage supplied from the original power supply device via the power supply connector; and power supply switching means, coupled to the power supply connector and the DC/DC converter means, for supplying the original power supply voltage and the direct-current power supply voltages to the data processing means when one of the commercial power source adapter or the battery unit is connected to the power supply connector and for supplying only the direct-current power supply voltages generated by the DC/DC converter means to the data processing means when the connection device coupled to the automobile power source is connected to the power supply connector.

BRIEF DESCRIPTION OF THE DRAWINGS

Other objects, features and advantages of the present invention will become more apparent from the following detailed description when read in conjunction with the accompanying drawings, in which:

FIGS. 1A, 1B and 1C are respectively block diagrams illustrating a conventional facsimile machine in which different adapters are used for different applications;

FIG. 5A is a block diagram illustrating a commercial power source adapter used in the embodiment of the present invention shown in FIG. 2;

FIG. 5B is a block diagram illustrating a connection device coupled to an automobile power source used in the embodiment of the present invention shown in FIG. 2;

FIG. 5C is a block diagram illustrating a battery unit used in the embodiment of the present invention shown in FIG. 2.

DESCRIPTION OF THE PREFERRED EMBODIMENT

A description will now be given of a facsimile machine according to a preferred embodiment of the present invention.

Figure 2:
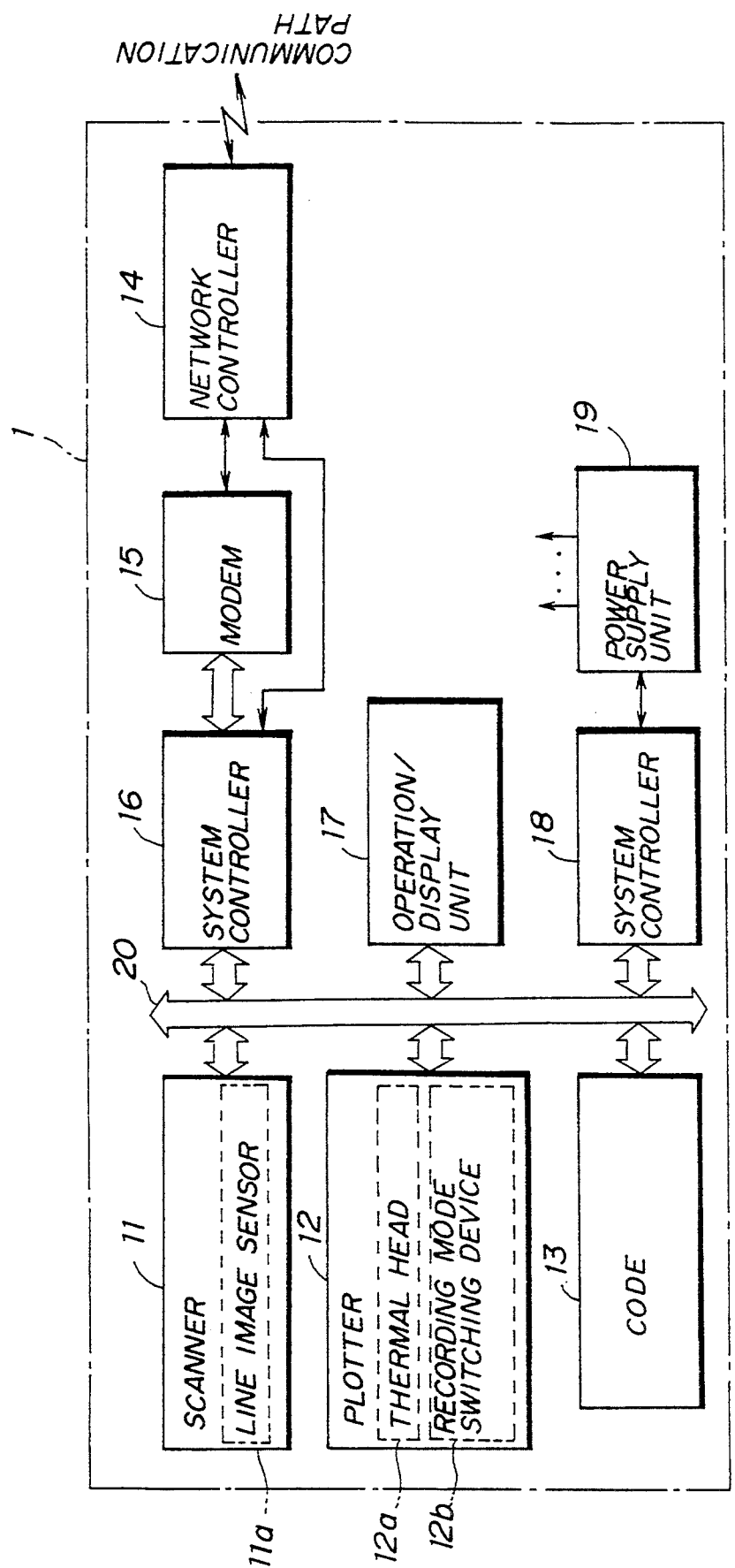
FIG. 2 is a block diagram illustrating a facsimile machine according to a preferred embodiment of the present invention.

Referring to FIG. 2, there is illustrated the entire structure of a facsimile machine according to a preferred embodiment of the present invention. A facsimile machine shown in FIG. 2 is composed of a scanner 11, a plotter 12, a coder/decoder (hereinafter simply referred to as a codec) 13, a network controller 14, a modulator/demodulator (hereinafter simply referred to as a modem) 15, a communication controller 16, an operation/display unit 17, a system controller 18 and a power supply unit 19. A system bus 20 mutually connects the scanner 11, the plotter 12, the codec 13, the communication controller 16, the operation/display unit 17 and the system controller 18.

The scanner 11 has a line image sensor 11a, which optically reads an original and generates a corresponding electrical signal. The plotter 12 has a thermal head 12a and a recording mode switching device 12b.

Figure 3A:
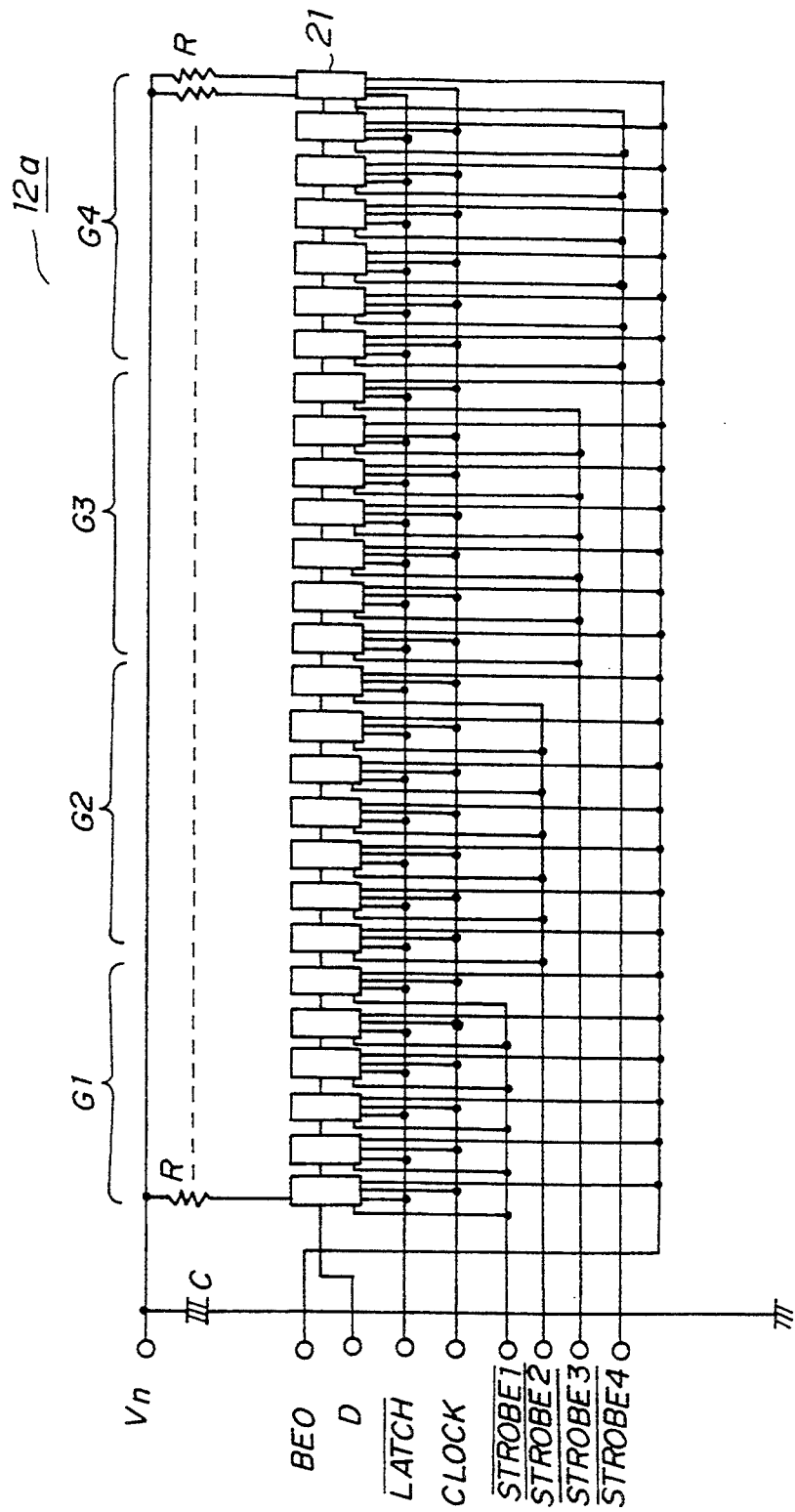
FIG. 3A is a circuit diagram of a thermal head shown in FIG. 2.

Referring to FIG. 3A, there is illustrated the structure of the thermal head 12a. The thermal head 12a shown in FIG. 3A has a plurality of heating elements R arranged into a line, and a plurality of drive transistor integrated circuits (ICs) 21. The thermal head records an image amounting to one line on a recording media. A positive voltage $V_H$ is applied to one end of each of the heating elements R. The other end of each register R is connected to a corresponding one of the driving transistor ICs 21. A power supply line having the voltage $V_H$ is grounded through a capacitor C. The heating elements R are grouped into four blocks G1, G2, G3 and G4. As will be described later, the heating elements R are also grouped into two blocks, one of which consists of the blocks G1 and G2, and the other block consists of the blocks G3 and G4. The thermal head 12a operates in a four-block recording mode in which the heating elements R are grouped into four and an image amounting to one line is recorded for 10 ms. Alternatively, the thermal head 12a operates in a two-block recording mode in which the heating elements R are grouped into two and an image amounting to one line is recorded for 20 ms.

FIG. 3B-(I) is a waveform diagram showing signals supplied to the thermal head 12a in a four-block recording mode. Data D is transferred in synchronism with a data clock signal CLOCK which is generated by the system controller 18. After an system controller 18 is applied to the driving transistor ICs 21, four low-active strobe signals $\overline{STROBE1}$, $\overline{STROBE2}$, $\overline{STROBE3}$ and $\overline{STROBE4}$ generated by the system controller 18 are successively applied to the driving transistor ICs 21 related to the blocks G1, G2, G3 and G4, respectively. That is, the heating elements R of the blocks G1, G2, G3 and G4 are driven at different timings. While the strobe signals $\overline{STROBE1}$, $\overline{STROBE2}$, $\overline{STROBE3}$ and $\overline{STROBE4}$ are being supplied to the driving transistor ICs 21, a voltage BEO is set to a high level. Each of the strobe signals $\overline{STROBE1}$, $\overline{STROBE2}$, $\overline{STROBE3}$ and example, 5 ms.

Figure 3B:
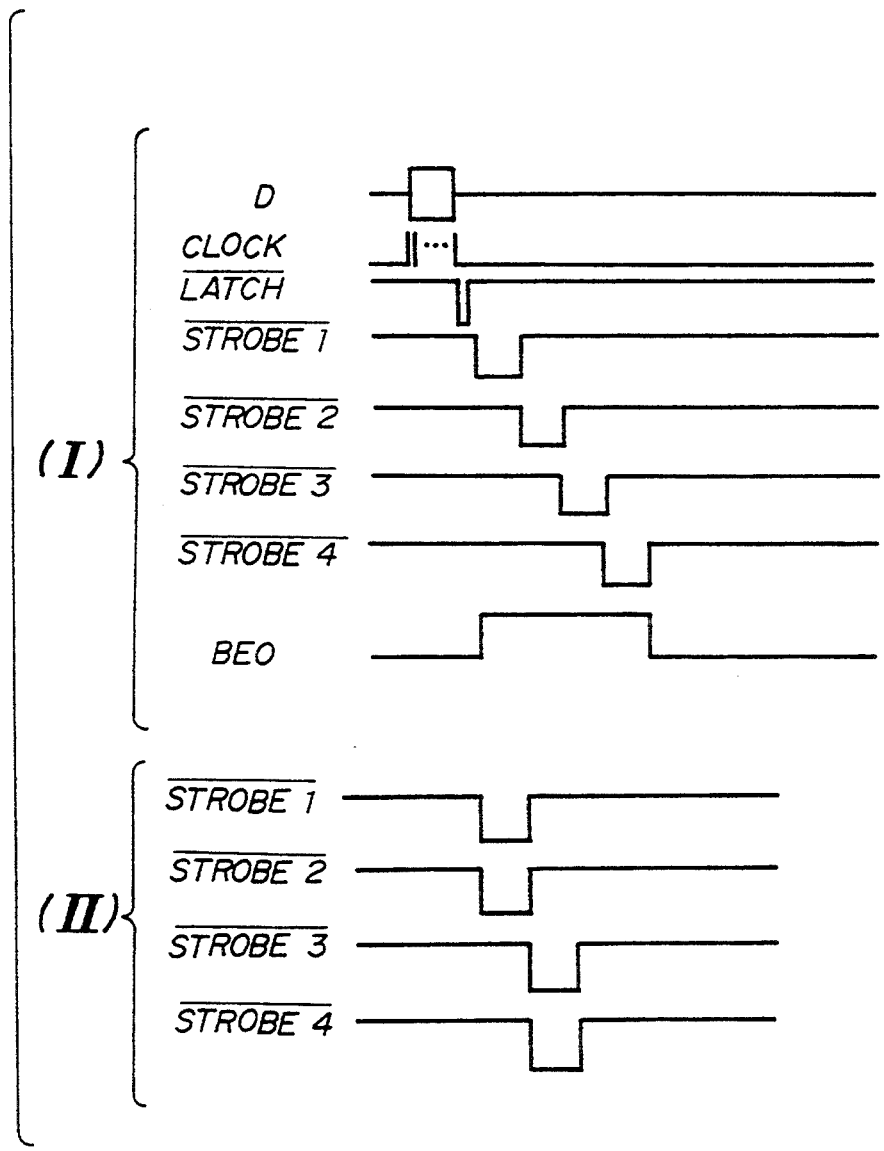
FIG. 3B is a waveform diagram illustrating the operation of the thermal head shown in FIG. 3A.

The heating elements R are also grouped into two blocks in the two-block recording mode. One of the two blocks consists of the blocks G1 and G2, and the other block consists of the blocks G3 and G4. In this case, the strobe signals $\overline{STROBE1}$, $\overline{STROBE2}$, $\overline{STROBE3}$ and $\overline{STROBE4}$ have waveforms as shown in FIG. 3B-(II). As shown, the strobe signals $\overline{STROBE1}$ and $\overline{STROBE2}$ simultaneously fall and rise, and the strobe signals $\overline{STROBE3}$ and $\overline{STROBE4}$ simultaneously fall and rise.

Figure 3C:
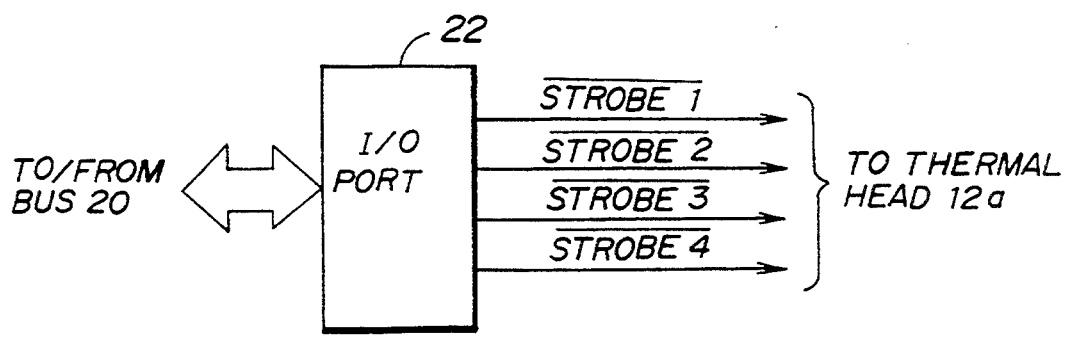
FIG. 3C is a block diagram of a recording mode switching device shown in FIG. 2.

FIG. 3C illustrates the structure of the recording mode switching device 12b. The recording mode switching device 12 is formed of an input/output port 22, which is provided between the bus 20 and the thermal head 12a. Under the control of the system controller 18, the I/O port 22 generates the strobe signals $\overline{STROBE1}$, $\overline{STROBE2}$, $\overline{STROBE3}$ and $\overline{STROBE4}$ shown in FIG. 3B-(I) when the thermal head 12a is driven in the four-block recording mode, and generates the strobe signals $\overline{STROBE1}$, $\overline{STROBE2}$, $\overline{STROBE3}$ and $\overline{STROBE4}$ shown in FIG. 3B-(II) when the thermal head 12a is driven in the two-block recording mode.

Turning now to FIG. 2, the codec 13 encodes image information to be transmitted, and decodes received demodulated image information. The network controller 14 interfaces with a communication path, such as a public telephone line or a radio channel, and carries out a conventional call sending/call accepting procedure. The modem 15 modulates the encoded image information and demodulates the received image signal. Further, the modem 15 sends and receives various transmission procedure signals as defined in the CCITT Recommendations. The communication controller 16 controls the network controller 14 and the modem 15 to thereby realize a facsimile transmission based on the predetermined transmission procedures. The operation/display unit 17 has a display device, which displays the operating status of the facsimile machine, and an input device through which the operator inputs various information to the facsimile machine. The power supply unit 19 supplies the structural elements of the facsimile machine with DC power having various voltages.

Figure 4:
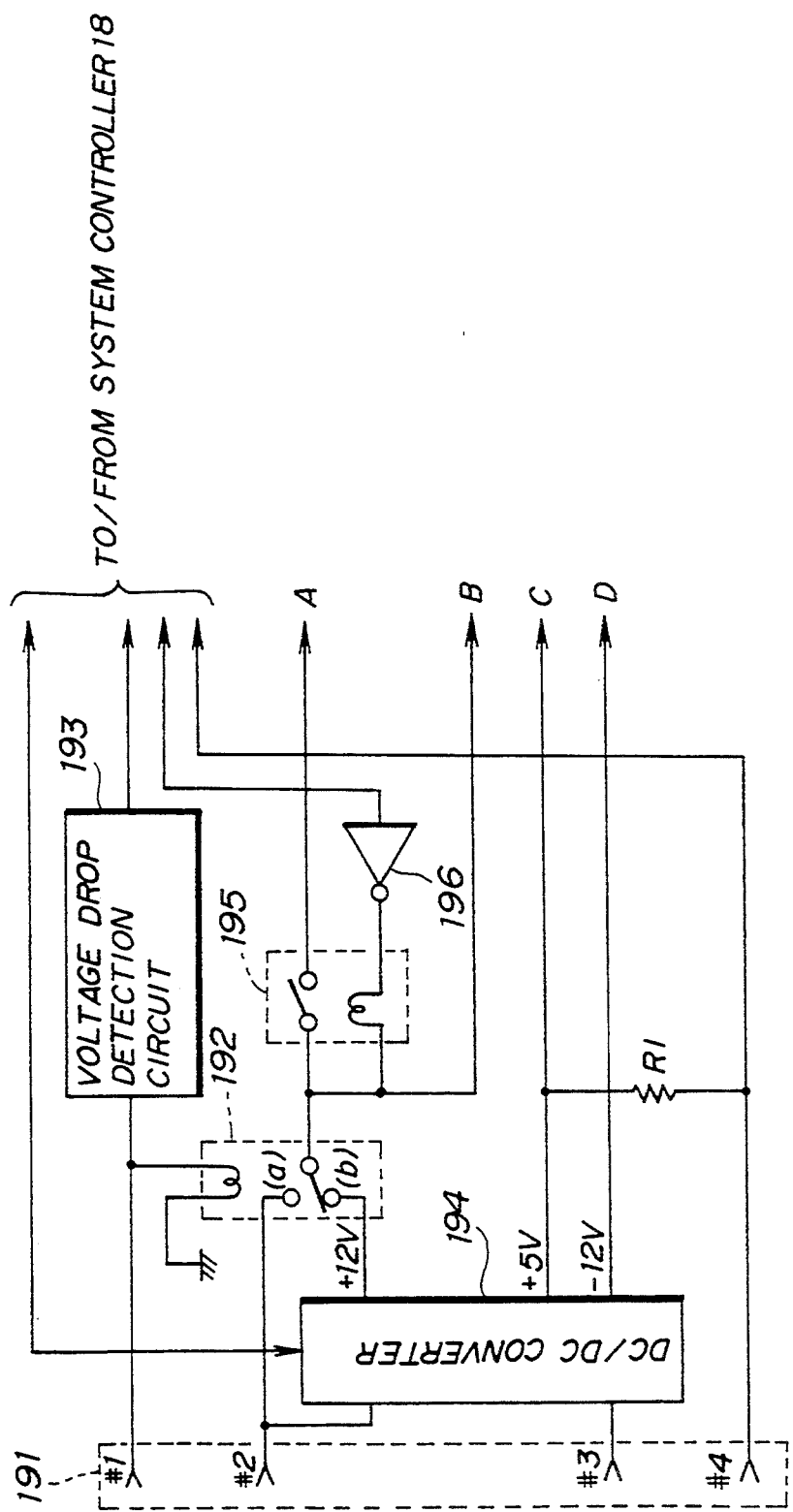
FIG. 4 is a circuit diagram of a power supply unit shown in FIG. 2.

Referring to FIG. 4, there is illustrated the structure of the power supply unit 19. As shown, the power supply unit 19 is composed of a power supply connector 191, a relay 192, a battery voltage drop detection circuit 193, a DC/DC converter 194, a relay 195, a relay driver 196 and a resistor R1.

The power supply connector 191 is provided in the facsimile machine main body 1. The power supply connector 191 has terminals #1, #2, #3 and #4. The terminal #1 is connected to an end of a coil of the relay 192 and an input terminal of the battery voltage drop detection circuit 193. The other end of the coil of the relay 192 is grounded. The terminal #2 of the power supply connector 191 is connected to a make-contact (a) of the relay 192, and an input terminal of the DC/DC converter 194. The terminal #3 of the power supply connector 191 is connected to a ground terminal of the DC/DC converter 194 and grounded. The DC/DC converter 194 has a +12 V output terminal through which a DC voltage equal to +12 volts is output. The +12 V output terminal is connected to a brake-contact (b) of the relay 192. A common terminal of the relay 192 is connected to one end of a coil of the relay 195, and connected, as a power supply system A, to structural elements of the facsimile machine main body 1 via a switch circuit of the relay 195. More specifically, the power supply system A is connected to structural elements which consume a large amount of power, such as the line image sensor 11a of the scanner 11, the thermal head 12a of the plotter 12, and motors respectively provided for transporting a recording sheet and original. The common terminal of the relay 192 also serves as a power supply system B, which is coupled to various logic circuits and analog circuits of the facsimile machine main body 1. The DC/DC converter 194 has a +5 V output terminal through which a voltage of +5 volts is output, serves as a power supply system C, which is coupled to logic circuits of the facsimile machine main body 1. Further, the DC/DC converter 194 has a −12 V output terminal through which a voltage of −12 volts is output, serves as a power supply system D, which is coupled to various logic circuits and analog circuits of the facsimile machine main body 1.

A detection signal which is output by the codec 13 (FIG. 2) when data is received, is input to the system controller 18, which outputs a control signal to the relay driver 196 in response to the detection signal. The output terminal of the relay driver 196 is connected to the other end of the coil of the relay 195. The terminal #4 of the power supply connector 191 is coupled to the +5 V output terminal of the DC/DC converter 194 via the resistor R1, and directly connected to the system controller 18.

The facsimile machine main body 1 is used together with original power supply devices respectively shown in FIGS. 5A, 5B and 5C. More specifically, FIG. 5A illustrates a commercial power source adapter 6, which is electrically connected to a commercial power source having a voltage equal to, for example, 100 volts. The commercial power source adapter 6 shown in FIG. 5A is composed of a power supply connector 61 and a stabilized power supply circuit 62. The stabilized power supply circuit 62 converts a 100 V AC power into a +12 V DC power, which is supplied to terminals #1 and #2 of the power supply connector 61. The stabilized power supply circuit 62 has a ground terminal G, which is connected to terminals #3 and #4 of the power supply connector 61.

FIG. 5B illustrates a connection device 7 which is connected to an automobile power source. The connection device 7 is made up of a power supply connector 71, a plug 72 and a cable 73 mutually connecting the power supply connector 71 and the plug 72. The power supply connector 71 has four terminals #1, #2, #3 and #4. The plug 72, which is inserted into a socket of a cigarette lighter, has two wires. One of the two wires which has a voltage of +12 volts is connected to the terminal #2 of the power supply connector 71, and the other wire at the ground potential is connected to the terminal #3 thereof. The terminals #1 and #4 are not used.

FIG. 5C illustrates a battery unit 8, which is composed of a power supply connector 81 and a +12 V nickel cadmium battery 82. A positive terminal of the nickel cadmium battery 82 is connected to terminals #1 and #2 of the power supply connector 81, and a negative terminal thereof is connected to a terminal #3 thereof. A terminal #4 is not used.

It is preferable that a housing of the facsimile machine have a space which accommodates the the commercial power source adapter 6 and/or the battery unit 8. When the facsimile machine is driven by the commercial power source, the commercial power supply adapter 6 (FIG. 5A) is loaded into the the housing of the facsimile machine and the power supply connector 61 of the commercial power source adapter 6 is connected to the power supply connector 191 (FIG. 4) of the facsimile machine main body 1. When the facsimile machine is driven by the automobile power source, the plug 72 (FIG. 5B) is inserted into the socket of the cigarette lighter, and the power supply connector 71 is connected to the power supply connector 191. When the facsimile machine is driven by the battery, the battery unit 8 (FIG. 5C) is loaded into the space, and the connector 81 is connected to the connector 191.

A description will now be given of the operation of the facsimile machine. When the commercial power source adapter 6 (FIG. 5A) is used, the voltage equal to +12 volts is applied to the terminals #1 and #2 of the power supply connector 191 (FIG. 4), and the terminals #3 and #4 thereof are grounded. Thus, a current passes through the coil of the relay 192, so that the common contact of the relay 192 is switched to the make-contact (a) thereof. As a result, the power supply system B is directly supplied with the +12 V DC power generated and output by the stabilized power supply circuit 62 (FIG. 5A). The +12 V DC power is also supplied to the DC/DC converter 194 via the terminals #2 of the connectors 61 and 191. The DC/DC converter 194 generates the +5 V DC power and −12 V DC power from the supplied +12 V DC power, which are supplied to the power supply systems B and C, respectively.

When the facsimile machine is driven by the battery unit 8 shown in FIG. 5C, the +12 V DC power is applied to the terminals #1 and #2 of the power supply connector 191, and the terminal #3 thereof is grounded. In this case, a current passes through the coil of the relay 192, so that the common contact thereof is connected to the make-contact (a). Thus, the +12 V DC power generated and output by the nickel cadmuim battery 82 is directly supplied to the power supply system B via the relay 192. On the other hand, the DC/DC converter 194 generates the +5 V DC power and the −12 V DC power from the +12 V DC power generated and output by the nickel cadmuim battery 82, which are respectively supplied to the power supply systems C and D.

When the facsimile machine is driven by the automobile power source, the +12 V DC power is supplied to the terminal #2 of the power supply connector 191, and the terminal #3 thereof is grounded. It will be noted that no DC power is applied to the terminal #1 of the connector 191. Thus, the common contact of the relay 192 is switched to the brake-contact (b) thereof. The DC/DC converter 194 is driven by the +12 V DC power generated and output by the automobile power source, and generates the +12 V DC power, +5 V DC power and −12 V DC power, which are respectively supplied to the power supply systems B, C and D.

Figure 6:
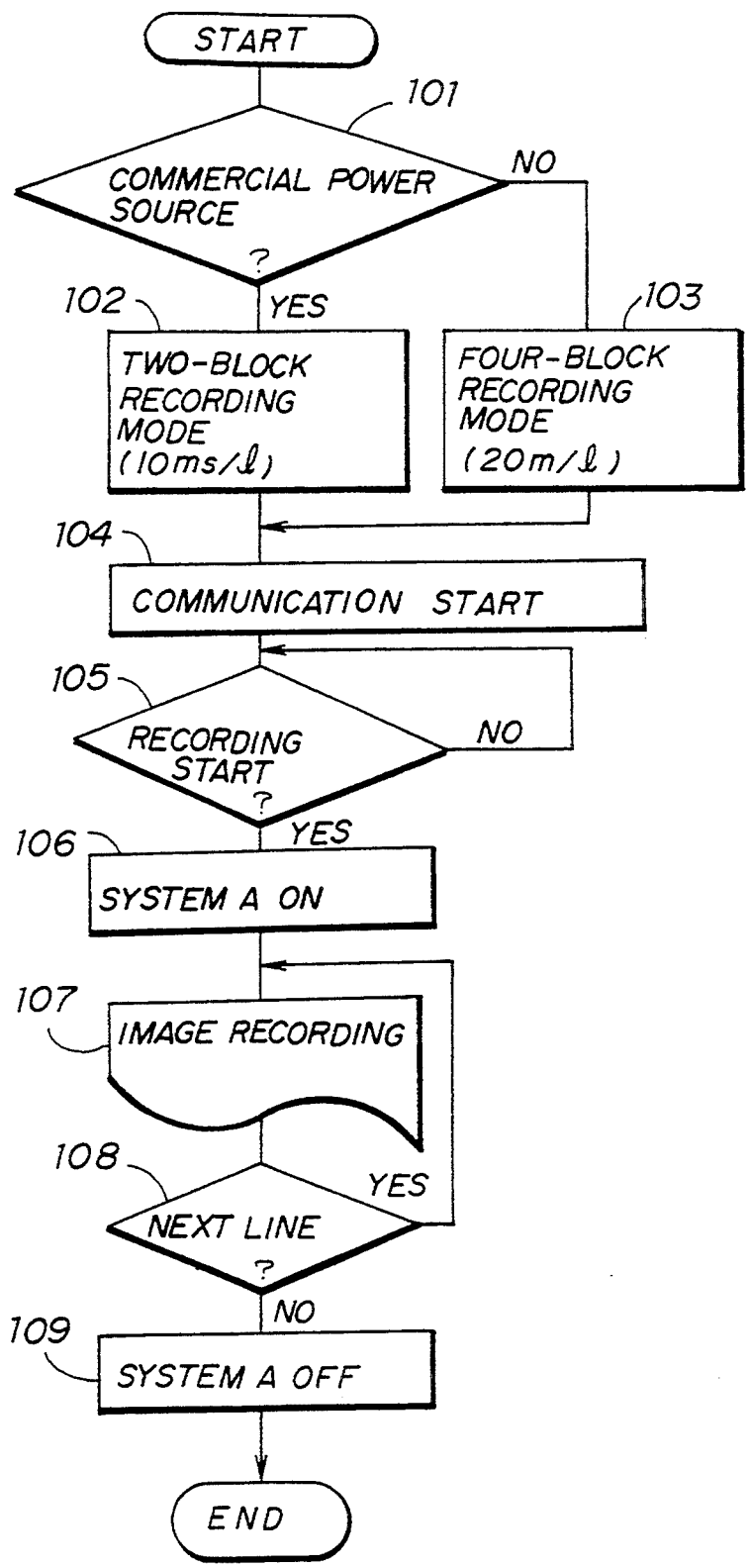
FIG. 6 is a flowchart illustrating the operation of the facsimile machine shown in FIG. 2.

A description will now be given of a receive operation of the facsimile machine with reference to FIG. 6. After the facsimile machine starts the receive operation, at step 101, the system controller 18 shown in FIG. 2 determines whether or not the commercial power source adapter 6 is being used by checking the potential of the terminal #4 of the power supply connector 191. It will be noted that the terminal #4 of the power supply connector 191 is grounded when the commercial power source adapter 5 shown in FIG. 5A is connected to the power supply connector 191. Thus, when the system controller 18 determines that the terminal #4 of the power supply connector 191 is equal to the ground potential, it recognizes that the commercial power source adapter 6 is being used.

When it is determined, at step 101, that the commercial power source is being used, the system controller 18 selects the two-block recording mode at step 102. On the other hand, when it is determined, at step 101, that the commercial power source is not being used, the system controller 18 selects the four-block recording mode at step 103. It will be noted that either the automobile power source or the battery is being used when the result obtained at step 101 is NO.

After that, at step 104, the facsimile communication is started under the control of the communication controller 16. At the commencement of the facsimile communication, a facsimile machine on the transmission side is informed of the recording speed related to the recording mode selected by step 102 or step 103. When the system controller 18 determines, at step 105, whether or not image information sent from the facsimile machine on the transmission side is received and the image recording should be started, the system controller 18 sends the aforementioned control signal to the relay 195 (FIG. 4) via the relay driver 196. In response to the control signal, the switch of the relay 195 is closed at step 106, so that it is started to supply the power supply system A with the +12 V DC power. As has been described previously, the power supply system A is coupled to the line image sensor 11a, the thermal head 12a and the motors. At step 107, the plotter 12 records the received image information on the recording sheet in the selected recording mode. It should be noted that an amount of current twice that of current supplied in the four-block recording mode passes through the thermal head 12a in the two-block recording mode. Each time the recording of one line is completed, the system controller 18 judges, at step 108, whether or not there is the next line to be recorded. When the result obtained at step 108 is NO, the system controller 18 outputs the control signal to the relay 195 via the relay driver 196 so that the switch thereof is opened. Then, the receive operation ends.

The battery voltage drop detection circuit 193, which is formed of, for example, a comparator, judges whether or not the voltage of the terminal #1 of the power supply connector 191 is equal to or less than a predetermined voltage equal to, for example, 11 volts. When it is determined that the voltage of the terminal #1 of the power supply connector 191 is equal to or less than the predetermined voltage, the battery voltage drop detection circuit 193 outputs a voltage drop detection signal to the system controller 18. It will be noted that a voltage drop will frequently occur when the battery unit 8 shown in FIG. 5 is used. When the system controller 18 receives the voltage drop detection signal during a time when image information is being sent or received, the system controller 18 stops the image recording or reading operation, and on the other hand, outputs the control signal to the relay 195 so that the switch thereof is opened. As a result, the power supply to the power supply system A is stopped. It is preferable that the system controller 18 control the operation/display unit 17 (FIG. 2) so that an alarm is displayed thereon and the input operation by the operator is inhibited.

According to the above-mentioned preferred embodiment of the present invention, the facsimile machine main body 1 has the built-in DC/DC converter 194 (FIG. 4) which generates necessary DC power having various voltages from AC power supplied from an external power source. Thus, it is possible to provide the structural elements of the facsimile machine with stabilized DC power even when the automobile power source having a great voltage variation between 10 and 16 volts, for example. In addition, it is possible to efficiently fabricate the power supply system of the facsimile machine and reduce the production cost since the DC/DC converter 194 is used in common for the commercial power source, automobile power source and battery source.

The DC power generated by the commercial power source adapter 6 or the battery unit 8 is directly supplied to the power supply system A which consumes a large amount of power. Thus, the power supply system A has no power loss caused by the DC/DC converter 194 and the +12 V DC power can be efficiently supplied to the power supply system A.

When the commercial power source is used, the two-block recording mode is selected in which a large amount of current passes through the thermal head 12a, as compared with the cases where the other power sources are used. Thus, it becomes possible to record an image at a high speed without increasing the load of the DC/DC converter 194. If a capacity necessary to supply the power supply system A with a large amount of current via the DC/DC converter 194 is equal to 100 W, it is sufficient for the DC/DC converter 194 to have a capacity of approximately 60 W according to the embodiment of the present invention.

The relay 192 selects the make-contact (a) of the relay 192 when the commercial power source adapter 6 or the battery unit 8 is used, and selects the brake-contact (b) thereof when the power supply controller 71 is selected. That is, the appropriate power supply route is automatically selected without a special manipulation by the operator.

In the aforementioned embodiment of the present invention, the two-block recording mode is selected only when the commercial power source adapter 6 is used. Alternatively, it is possible to select the two-block recording mode when the battery unit 8 having the nickel cadmium battery 82 is used because generally, nickel cadmium batteries are capable of providing a large amount of current. It is also possible to group the heating elements R (FIG. 3A) into an arbitrary number of blocks. Although the facsimile machine has been specifically described, the present invention includes data processing devices other than facsimile machines, such as printing machines.

The present invention is not limited to the specifically disclosed embodiment, and variations and modifications may be made without departing from the scope of the present invention.

What is claimed is:

1. A data processing apparatus comprising:
a data processing means for processing data;
a power supply connector for detachably attaching a power supply to said data processing means and having a plurality of inputs therein;
an image recording means coupled to said data processing means for printing information on a printed medium;
an original power supply means detachably connectable to said power supply connector and wherein said original power supply means provides power from sources selected from among, a commercial power source adapter outputting a direct current voltage which is generated from a commercial power source, a battery unit, and an automobile power source which is coupled to a connection device adapted to be coupled to an automobile power source;
a direct-current/direct-current (DC/DC) converter means, coupled to said power supply connector for generating direct-current power supply voltages from a selected original power supply voltage supplied from a selected original power supply device via said power supply connector;
power supply switching means, coupled to the power supply connector in said DC/DC converter means for switching between supplying a power supply from the original power supply voltage in said direct-current power supply voltages to said data processing means when one of said commercial power source adapter or said battery unit is supplying power to said power supply connector and supplying only said direct-current power supply voltage generated by said DC/DC converter means to said data processing means when said connection device coupled to said automobile power supply is supplying power to said power supply connector;

voltage drop detection circuit means coupled to said power supply connector for automatically detecting and providing a signal indicative of the type of power supply being connected to said power supply connector based upon a voltage supplied and upon which inputs said power supply is connected to;

mode switching means coupled to said image recording means such that said image recording means has a first recording mode in which an image is recorded on said printed medium at a first recording speed when said voltage drop detection means detects that a commercial power source adapter is supplying voltage to said power supply connector and a second power saving mode in which an image is recorded on said printed medium at a second recording speed when one of said battery unit or said connection device coupled to said automobile power source is supplying voltage to said power supply connector and wherein said first recording speed is faster than said second recording speed and further wherein both recording modes operate on the same printed medium but at different power levels per unit time.

2. A data processing apparatus as claimed in claim 1, wherein:

said DC/DC converter means having two outputs, the first of which is is coupled to a first terminal which outputs a first direct-current power supply voltage having approximately the same amount of power as the original power supply voltage and wherein the second output is coupled to a second terminal which outputs a second direct-current power supply voltage of a different power level from the original power supply voltage.

3. A data processing apparatus as claimed in claim 2, wherein:

said power supply switching means comprises a relay composed of a coil and a switch;

said power supply connector comprises a terminal which allows a current from said commercial power source adapter or said battery unit to pass through said coil; and the switch has a first state where said original power supply voltage is supplied to said data processing means while said current passes through said coil, and a second state where said first direct-current power supply voltage is supplied to the data processing means in place of said original power supply voltage when said power supply connector is connected to said connection device coupled to said automobile power source and thus no current passes through said coil.

4. A data processing apparatus as claimed in claim 2, wherein said power supply connector further comprises:

a terminal to which the original power supply voltage generated by said commercial power source adapter or said battery unit is applied; and said data processing apparatus further comprises a voltage drop detecting means, coupled to said terminal of the power supply connector, for detecting any voltage drop of said terminal exceeding a predetermined voltage drop and for stopping the original power supply voltage and said first direct-current power supply voltage from being supplied to said data processing means when said voltage drop exceeding said predetermined voltage drop is detected.

5. A data processing apparatus as claimed in claim 1, further comprising:

detection means, coupled to said power supply switching means, for detecting which one of said commercial power source adapter, said battery unit and said connection device coupled to said automobile power source is supplying voltage to said power supply connector and for controlling said power supply switching means on the basis of a detection result.

6. A data processing apparatus as claimed in claim 5, wherein:

said power supply connector has a terminal at which a predetermined voltage is obtained only when said commercial power source adapter is connected to said power supply connector; and said detection means comprises means for determining whether or not said predetermined voltage is obtained at said terminal of the power supply connector and for controlling said image recording means on the basis of a determination result.

7. A data processing apparatus as claimed in claim 1, wherein said image recording means comprises:

a thermal head having a plurality of heating elements which are arranged into a line and which are grouped into a first number of blocks in said first recording mode and a second number of blocks in said second recording mode, said first number of blocks being less than said second number of blocks; and said thermal head further comprises driving means for driving said heating elements so that said heating elements are successively driven for each of said first number of blocks in said first mode and are successively driven for each of said second number of blocks in said second recording mode.

8. A data processing apparatus as claimed in claim 1, wherein said power supply switching means comprises means for directly supplying said image recording means with the original power supply voltage when one of said commercial power source adapter or said battery unit is connected to said power supply connector and for supplying said image recording means with one of said direct-current power source voltages generated by said DC/DC converter means in place of the original power supply voltage when said connection device coupled to said automobile power source is connected to said power supply connector.

9. A data processing apparatus as claimed in claim 1, wherein said commercial power source adapter comprises:

converting means for converting a commercial alternating-current voltage into said direct-current voltage corresponding to the original power supply voltage; and a connector coupled to said power supply connector and applying said direct-current voltage supplied from said converting means to said power supply connector.

10. A data processing apparatus as claimed in claim 1, wherein said connection device coupled to said automobile power source comprises:

a plug coupled to a socket connected to said automobile power source and outputting a direct-current power supply voltage generated by said automobile power source corresponding to the original power supply voltage; and a connector coupled to said plug and applying said direct-current power supply voltage generated by said automobile power source to said power supply connector.

11. A data processing apparatus as claimed in claim 1, wherein said battery unit comprises:

a battery generating a direct-current power supply voltage corresponding to the original power supply voltage; and a connector coupled to said battery and applying said direct-current power supply voltage generated by said battery to said power supply connector.

12. A data processing apparatus as claimed in claim 1, wherein said data processing means comprises communication means for receiving data from a transmission path and for transmitting data to said transmission path.

13. A data processing apparatus as claimed in claim 12, said data processing means comprises:

optical scanner means for optically reading an original document and for outputting an electrical signal which is to be sent to said transmission path via said communication means; and image recording means for recording an image defined by said data received from said transmission path via said communication means.

* * * * *